Patented July 10, 1945

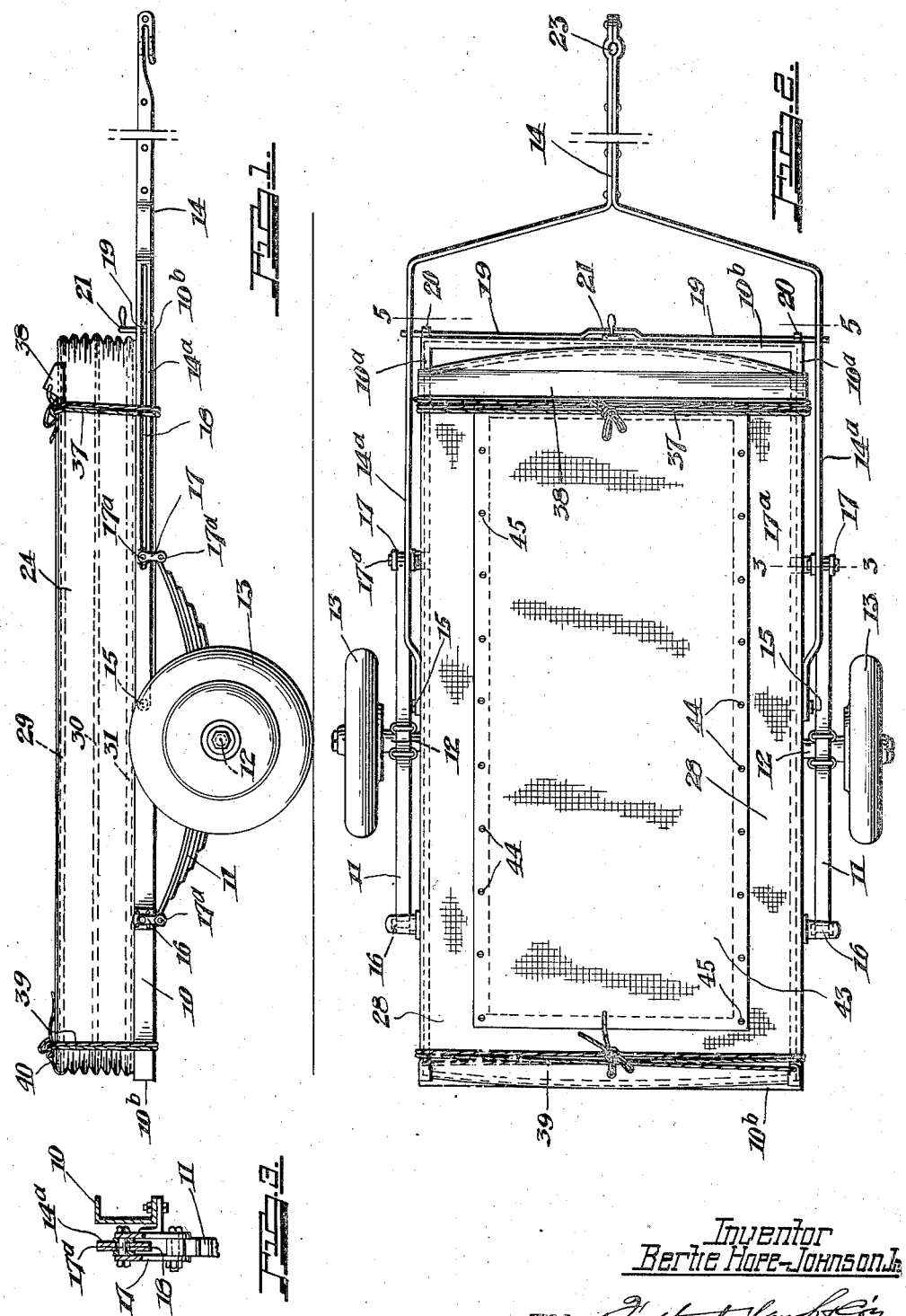

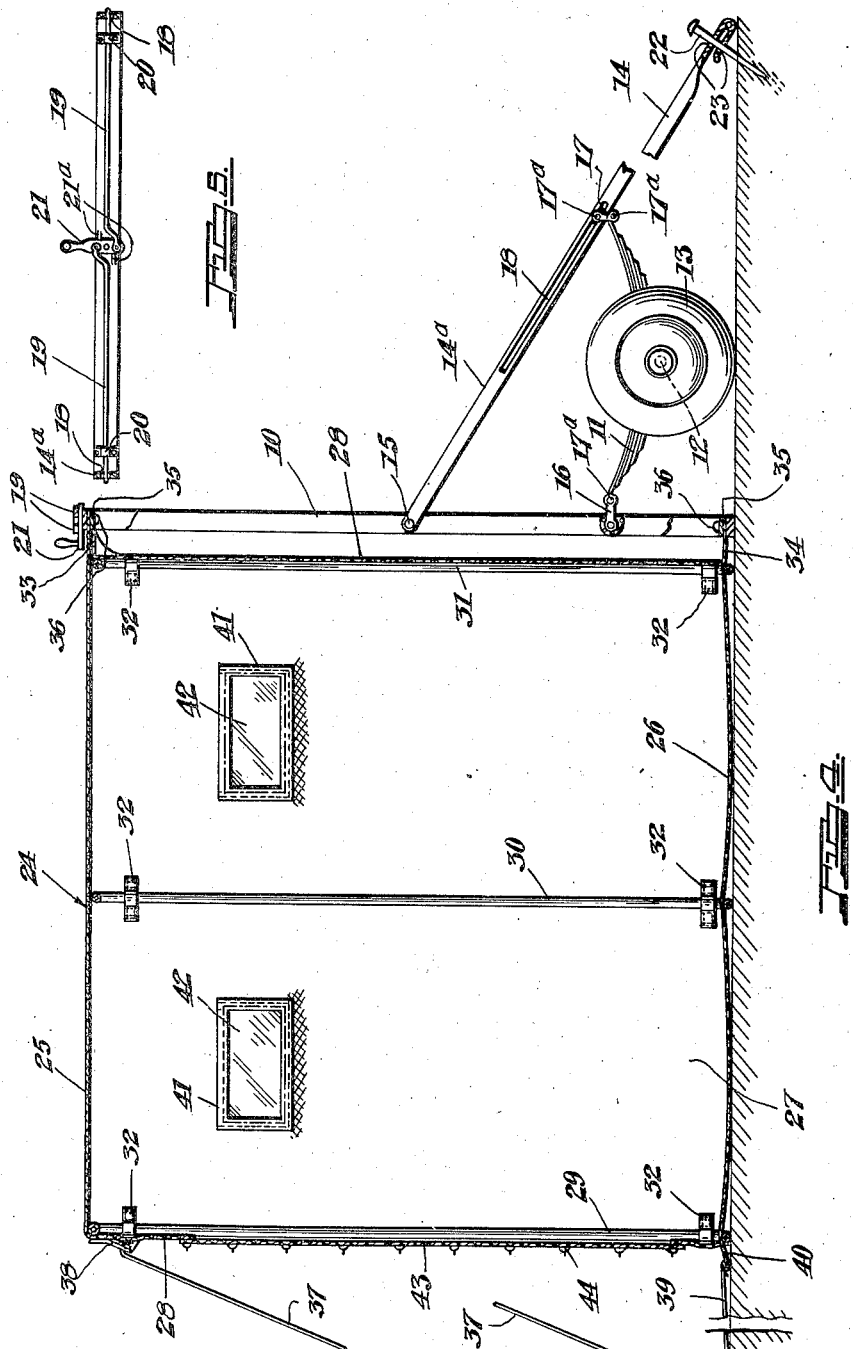

2,380,045

UNITED STATES PATENT OFFICE 2,380,045

COLLAPSIBLE TRAILER HOUSE

Bertie Hope-Johnson, Jr., Saskatoon, Saskatchewan, Canada

Application May 16, 1944, Serial No. 535,855

2 Claims. (Cl. 296—23)

This invention relates to a collapsible trailer house in which the frame of the trailer is pivoted on its suspension means so that it stands upright and cooperates with at least one other corresponding frame member, spaced therefrom, to support a tent-like fabric covering, the whole forming a collapsible house, and the collapsed structure being transported (in the horizontal plane) as part of the trailer.

The conventional house tent involving a ridge pole, end poles and a relatively great number of guy ropes has the disadvantages that considerable time and labour are required in erecting it and that its poles and particularly the ridge pole, are not readily and quickly stowed. On the other hand, the conventional house trailer, which cannot be converted to a work trailer and is therefore of restricted usefulness, involves an expense which puts it beyond the reach of the average person and in any event its weight and balancing are such as to interfere seriously with the driving and sometimes with the control of the towing vehicle. A bump in the road starts it pitching, thus moving the rear of the towing vehicle up and down. On some types of road such a house trailer developes a tendency to weave and thus to move the rear of the towing vehicle laterally with consequences which on a slippery road may be serious.

The object of the present invention is to provide a relatively inexpensive and light collapsible trailer house which, using the main frame of the trailer as a support for the house, has very substantial stability and may be rapidly erected, and may be as rapidly and readily stowed and transported.

A further object of the invention is to provide a collapsible trailer house in which the trailer frame is so connected to its suspension means that it may be pivoted into an upright position to cooperate with at least one other corresponding frame member spaced therefrom to support a tent-like fabric covering, the covering and the spaced frame member being collapsed onto the trailer frame to be carried on top of it during travel.

A further object of the invention is to provide a collapsible trailer house as described having a forked tow bar pivotally connected to the trailer frame, and having the trailer suspension means pivotally connected to the frame at one point and indirectly connected to the frame at another point through the tow bar, a shackle pin forming part of the suspension means being connected to slide in a slot formed in each fork of the tow bar whereby when the tow bar is pivoted in relation to the frame each shackle pin slides in the appropriate slot, the trailer frame pivots into the upright position and the tow bar acts as a supporting strut or brace for the upstanding trailer frame and may be anchored to give it stability and rigidity. Means are also provided for preventing the tow bar from pivoting in relation to the trailer frame at least during travel.

Other objects and features of the invention will appear from the appended claims and from the following description by reference to the drawings in which:

Fig. 1 is a side elevation of the trailer house collapsed and ready to be transported, Fig. 2 is a top view of the trailer house in the condition shown in Fig. 1, Fig. 3 is an enlarged section on the line 3—3 of Fig. 2, the spring being cut away, Fig. 4 is a longitudinal section of the erected trailer house, and Fig. 5 is a fragmentary section on the line 5—5 in Fig. 2 showing the means for preventing the tow bar from pivoting in relation to the trailer frame.

The basic components of the collapsible house trailer are a channel iron trailer frame 10 with side rails 10a and end rails 10b, conventional leaf springs 11 connected to axle 12, wheels 13 mounted thereon, and tow bar 14. This tow bar is forked and each fork 14a is pivotally connected to the frame 10 at a point 15, one on each side rail 10a, between the ends of the leaf springs 11. The latter are at their rear end connected to frame 10 through shackles 16 and at their front ends the leaf springs 11 are indirectly connected to the frame 10 through shackles 17, having pins 17a slidably engaging and adapted to slide in slots 18 running longitudinally of each fork 14a of tow bar 14.

Tow bar 14 is normally prevented from pivoting in relation to the frame by means of locking bars 19, the ends of which engage in slots 18 in each fork 14a. These locking bars 19 slide in brackets 20 secured to the front end rail 10b of frame 10 and are operated by lever 21 which when pivoted in one direction moves both bars away from the centre point of the trailer so that they may be caused to extend into and engage in the slots 18, and when moved in the other direction withdraws the bars from the slots 18 thereby permitting the tow bar to pivot in relation to the frame 10. Studs 21a resist movement of lever 21 from the locking position shown in Fig. 5.

The shackles 16 are in the usual way pivotally connected to the frame 10 so that when the locking bars 19 have been withdrawn from the slots 18 the frame 10 may be pivoted into an upright position as shown in Fig. 4 with the rear end of the frame 10 resting on the ground, the distance between the shackle 16 and the rear end of the frame 10 having been appropriately calculated for this purpose. As the frame 10 is thus pivoted to the upright position, shackle pins 17a slide in slots 18 until the frame is in upright position and the coupling end of the tow bar 14 rests on the ground. The tow bar thus acts as a strut or brace for the upstanding frame 10 and it may be anchored by a stake 22 passed through a hole 23 formed in the coupling end of the tow bar, and driven into the ground. At the same time the frame 10 is supported against lateral movement by the wheels 13 through the springs 11, shackles 16 and 17, and tow bar forks 14a.

After the frame 10 has so been pivoted into the upright position the collapsible house, which is shown in Fig. 1 in the collapsed position ready for transportation, is opened out and set in proper position. It comprises a tent-like fabric covering 24 having a roof 25, floor 26, side walls 27, end walls 28 and supporting frame members 29, 30 and 31 adapted, with frame 10, to support the fabric covering in erected position. Each frame member corersponds in dimensions to the frame 10 but is formed of a single piece of welded steel tubing and has the top cross piece arched so as to provide an arched roof. The frame members are as shown preferably connected to the fabric covering by loops 32 so that the three frame members 29, 30 and 31 and the covering may be collapsed onto the frame 10 as a unit (see Fig. 1). Extensions 33 and 34 of the roof 25 and floor 26 are connected respectively to the inner faces of the end rails 10b of frame 10 by battens 35 and bolts 36, the extension 33 being connected to the inner face.

Guy or anchor ropes are connected at the top rear corners to an eave flap 38 and guy ropes 39 are connected to flaps 40 shown as an extension of the floor 26. Windows 41 are sewn in the side walls 27 and these are adapted to receive removable Celluloid windows 42.

When it is desired to collapse the trailer house and make it ready for transport, the windows 42 are first removed from frames 41, then the anchor or guy ropes 37 and 39 are detached from their stakes and frames 29, 30 and 31 with the fabric appropriately folded between them accordion-wise, are moved up to the frame 10. Ropes 37 and 39 are now bound around the frames 10 and 29 to 31 and the fabric covering 24 to prevent them from becoming separated. Thereupon the stake 22 is withdrawn from the ground and from the hole 23, the frame 10 with the attached frames 29 to 31 and the covering 24 is pivoted into the horizontal plane, lever 21 is operated to project locking bars 19 into slots 18 and the collapsible trailer is ready to travel.

As shown in Figs. 2 and 4 the end wall 28 to which the eave flap 38 is attached is provided with a door flap 43 attached to the end wall 28 by means of turn buttons 44 projecting through grommeted holes 45 in the door flap.

It will be understood that modifications may be made in the collapsible trailer house described above without departing from the essence of the invention as claimed. Thus for example, the side walls 27 of fabric covering 24 can be attached directly to the frame 10 so that the supporting frame 31 may be dispensed with. Furthermore the length of the house can be decreased to a point where the frame member 30 is unnecessary or it can be increased and other frame members may be added.

As a further modification the frame 10 at the front end may be provided with a bracket at each side extending to the left in Fig. 4 so as to prevent all lateral movement of the frame 31 in relation to the frame 10.

What I claim as my invention is:

1. A collapsible trailer house comprising trailer suspension means, an axle connected thereto, wheels mounted on said axle, at least two tubular frames connected to and adapted, when spaced, to support a tent-like fabric covering and form therewith a collapsible house, a trailer frame consisting of two side rails joined by end rails at least at each end pivotally connected at each side to the suspension means to pivot on an axis substantially parallel to that of the wheels, a forked tow bar pivotally connected to each side of the trailer frame, said tow bar being adapted to brace said frame when it has been pivoted into the erected position and having means for preventing pivoting of the tow bar in relation to the frame at least during travel, a longitudinal slot formed in each fork of the tow bar, means connecting the suspension means to said frame at another point in the length of the frame, said connection being an indirect connection to the tow bar and comprising a shackle pin connected to the suspension means and adapted to slide in the slot formed in each fork of the tow bar, the two points of connection of the suspension means straddling the pivotal connection of the tow bar to the frame, and said indirect connection being adapted, on sliding of the shackle pins in the slots, to permit the trailer frame to be pivoted into an upright position to cooperate with said spaced frame members to support the fabric covering, means connecting the collapsible house to the trailer frame for support when erected and means for bracing the end of the collapsible house remote from the trailer frame, said house being collapsible onto said trailer frame to be carried on top of it during travel.

2. A collapsible trailer house as defined in claim 1, in which the collapsible house comprises side and end walls, and a roof and floor of canvas, the roof having an extension connected by batten to the front cross bar of the trailer frame, and the floor having at the same end of the house an extension connected by batten to the rear cross bar of the trailer frame, and said means for bracing the end of the house remote from the trailer frame comprises guy ropes connected respectively to the top and bottom of such end of the house.

BERTIE HOPE-JOHNSON, Jr.